United States Patent
Feng et al.

(10) Patent No.: US 8,463,093 B2
(45) Date of Patent: Jun. 11, 2013

(54) EXTENSION OF STEPS IN REFLECTIVE OPTICAL GRATINGS

(75) Inventors: Dazeng Feng, Arcadia, CA (US); Wei Qian, Arcadia, CA (US); Mehdi Asghari, San Marino, CA (US)

(73) Assignee: Kotura, Inc., Monterey Park, CA (US)

( * ) Notice: Subject to any disclaimer, the term of this patent is extended or adjusted under 35 U.S.C. 154(b) by 200 days.

(21) Appl. No.: 12/800,600

(22) Filed: May 18, 2010

(65) Prior Publication Data

US 2011/0286700 A1 Nov. 24, 2011

(51) Int. Cl.
 G02B 6/34 (2006.01)
 G02B 6/26 (2006.01)
 G02B 6/28 (2006.01)
 G02B 6/10 (2006.01)

(52) U.S. Cl.
 USPC ............... 385/37; 385/24; 385/27; 385/39; 385/129; 385/132

(58) Field of Classification Search
 USPC .............. 385/14, 24, 27, 31, 37, 39, 129, 132
 See application file for complete search history.

(56) References Cited

U.S. PATENT DOCUMENTS

| | | | |
|---|---|---|---|
| 4,506,949 A | 3/1985 | Knop | |
| 5,905,571 A | 5/1999 | Butler et al. | |
| 7,039,289 B1 | 5/2006 | Mendoza | |
| 7,151,635 B2 | 12/2006 | Bidnyk et al. | |
| 7,248,755 B2 | 7/2007 | Sappey et al. | |
| 7,409,123 B1 | 8/2008 | Feng et al. | |
| 7,457,496 B2 * | 11/2008 | Joyner | 385/37 |
| 7,542,641 B1 | 6/2009 | Asghari et al. | |

(Continued)

FOREIGN PATENT DOCUMENTS

WO WO 00/71981 11/2000

OTHER PUBLICATIONS

Densmore, A., "DWDM data receiver based on monolithic integration of an Echelle grating demultiplexer and waveguide photodiodes," Electronics Letters, vol. 41, No. 13 (2005).

(Continued)

*Primary Examiner* — Uyen Chau N Le
*Assistant Examiner* — Michael Mooney
(74) *Attorney, Agent, or Firm* — Gavrilovich, Dodd & Lindsey, LLP (57) ABSTRACT

An optical device includes a light-transmitting medium positioned on a base. The light-transmitting medium at least partially defines a free propagation region through which light signals travel. A reflective grating includes stepped reflecting surfaces positioned such that light signals that travel through the free propagation region are received by the reflecting surfaces. The reflecting surfaces are configured to reflect the light signal back into the free propagation region such that the light signals associated with different wavelengths separate as the light signals travel through the free propagation region. At least a portion of the reflecting surfaces each includes an overlapping region. Additionally, at least a portion of the reflecting surfaces each includes an overlapped region and un un-overlapped region. The reflecting grating is configured such that the light signals travel toward the overlapped regions and the un-overlapped regions before being reflected. The un-overlapped regions are positioned such that the un-overlapped regions receive the light signals but the overlapping regions are positioned between the overlapped region and the light signals so that the overlapping regions receive the light signals before the light signals can be received by the overlapped regions.

18 Claims, 9 Drawing Sheets

U.S. PATENT DOCUMENTS

2005/0141808 A1* 6/2005 Cheben et al. .................. 385/31
2006/0042322 A1  3/2006 Mendoza
2007/0086703 A1* 4/2007 Kirk et al. ...................... 385/37

OTHER PUBLICATIONS

Doi, Y. et.al, "Flat and high responsivity CWDM photoreceiver using silica-based AWG with multimode output waveguide," Electronics Letters, vol. 39, No. 22 (2003).

Janz, S., "Planar waveguide Echelle gratings in silica-on-silicon," IEEE Photonics technology letters, vol. 16, No. 12, 503-505(2004).

Kamei, Y. et al., "Low-loss and flat/wide-passband CWDM Demultiplexer Using Silica-based AWG with multi-mode output waveguides," Optical Society of America (2003).

McGreer, K.A., "Diffraction from concave gratings in planar waveguides," IEEE Photonics technology letters, vol. 7, No. 3, 324-326(1995).

Zhimin Shi, "A Hybrid diffraction method for design of etched diffraction grating demultiplexers," J. Lightwave Technology, vol. 23, No. 3, 1426-1434 (2005).

* cited by examiner

EXTENSION OF STEPS IN REFLECTIVE OPTICAL GRATINGS

RELATED APPLICATIONS

This application is related to U.S. Provisional Patent Application Ser. No. 61/284,724, filed on Dec. 23, 2009, entitled "Reducing Optical Loss in Reflective Gratings," and incorporated herein in its entirety.

FIELD

The present invention relates to optical devices and more particularly to optical devices used in communications applications.

BACKGROUND

Optical devices used in communications applications often have a light-transmitting medium positioned on a base. Optical gratings for separating light signals of different wavelengths are often formed in the light-transmitting medium. Waveguides for guiding the light signals can also be defined in the light-transmitting medium. The light-transmitting medium generally includes a free propagation region between the waveguides and the optical grating.

During operation of these optical devices, a portion of the waveguides carry the light signals to the free propagation region of the light-transmitting medium. The light signals travel through the free propagation region to the optical grating. The optical grating includes a reflecting surface that reflects the received light signals back into the free propagation region. The light signals are reflected such that the light signals of different wavelengths separate as they travel through the free propagation region. Another portion of the waveguides receive the separated light signals from the free propagation region and carry the separated light signals away from the optical grating.

These optical gratings are associated with an undesirably high level of optical loss and/or polarization dependent loss. As a result, there is a need for improved optical gratings.

SUMMARY

An optical device includes a light-transmitting medium positioned on a base. The light-transmitting medium at least partially defines a free propagation region through which light signals travel. A reflective grating includes stepped reflecting surfaces positioned such that light signals that travel through the free propagation region are received by the reflecting surfaces. The reflecting surfaces are configured to reflect the light signal back into the free propagation region such that the light signals associated with different wavelengths separate as the light signals travel through the free propagation region. At least a portion of the reflecting surfaces each includes an overlapping region. Additionally, at least a portion of the reflecting surfaces each includes an overlapped region and un un-overlapped region. The reflecting grating is configured such that the light signals travel toward the overlapped regions and the un-overlapped regions before the light signals are reflected. The un-overlapped regions are positioned such that the un-overlapped regions receive the light signals but the overlapping regions are positioned between the overlapped regions and the light signals so that the overlapping regions receive the light signals before the light signals can be received by the overlapped regions.

BRIEF DESCRIPTION OF THE FIGURES

FIG. 1A through FIG. 1C illustrate an optical device that includes input waveguides configured to carry multiple light signals to an optical grating. The optical grating is configured to demultiplex the light signals. The device includes output waveguides configured to carry the demultiplexed light signals away from the optical grating.

FIG. 2A through FIG. 2C illustrate a portion of a device precursor upon which the waveguides and optical grating is formed. A first mask is formed on the device precursor. The first mask leaves exposed a recess region of the device precursor and trench regions of the device precursor.

FIG. 3A through FIG. 3C illustrate a second mask formed over the first mask on the device precursor of FIG. 2A through FIG. 2C.

FIG. 4A through FIG. 4C illustrate a third mask is formed on the device precursor of FIG. 3A through FIG. 3C after removal of the second mask.

FIG. 5A through FIG. 5C illustrate a cladding formed on the device precursor of FIG. 4A through FIG. 4C after removal of the third mask and the first mask.

FIG. 6A through FIG. 6C illustrate a reflecting layer formed on the device precursor of FIG. 5A through FIG. 5C.

DESCRIPTION

The optical device includes an optical grating and a light-transmitting medium positioned on a base. Waveguides and a free propagation region are defined in the light-transmitting medium such that the free propagation region is positioned between the waveguides and the optical grating. During operation of the optical device, a portion of the waveguides carry the light signals to the free propagation region of the light-transmitting medium. The light signals travel through the free propagation region to the optical grating. The optical grating includes a series of stepped reflecting surface that each reflects the received light signals back into the free propagation region. The light signals are reflected such that the light signals of different wavelengths separate as they travel through the free propagation region. Another portion of the waveguides receive the separated light signals from the free propagation region and carry the separated light signals away from the optical grating.

In some instances, the stepped reflecting surfaces are configured such that a portion of the reflecting surfaces each overlaps another one of the reflecting surfaces. For instance, at least a portion of the reflecting surfaces can each includes an overlapping portion that is located between another one of the reflecting surfaces and one or more of the input waveguides. As a result, the overlapping portions of the reflecting surfaces receive the light signals rather than the overlapped portions of the reflecting surfaces receiving the light signals. Accordingly, the overlapped portion of a reflecting surface will not receive light signals during the operation of the optical grating.

Each pair of stepped reflecting surfaces in prior reflective gratings is connected by a shadow surface. The use of etches during the fabrication process causes the intersection between the reflecting surfaces and the shadow surface to be rounded. Light signals can be incident of these rounded intersections during the operation of the reflective grating. The rounded intersections cause light to be reflected in unwanted directions. As a result, the rounded shape serves as a source of optical loss and polarization dependent loss in these optical gratings. The current reflecting gratings eliminate at least a portion of the rounded intersections that receive light signals. For instance, in the current reflecting gratings, instead of light signals being incident on an intersection between a reflecting surface and a shadow surface the light signals can be incident on an interface between an overlapped portion of the reflecting surface and the remainder of the reflecting surface. This interface can be constructed such that overlapped portion of the reflecting surface has a contour that continues from the contour of the remainder of the reflecting surface. This continuous contour reduces the level of optical loss and/or polarization dependent loss in the reflective grating relative to prior reflective gratings.

The optical grating optionally includes a reflecting layer that reflects the light signals back into the free propagation region. A suitable reflecting layer includes metals. Due to the inaccuracies in the process of manufacturing these devices, a portion of this metal is positioned on top of the free propagation region of the light-transmitting medium. The metal on top of the free propagation region absorbs light from the free propagation region and is accordingly a source of optical loss for the optical device. Further, since this optical loss is through the top of the free propagation region, this loss is a source of polarization dependent loss (PDL). In order to reduce this optical loss, the current optical device optionally includes a buffer layer between the top of the free propagation region and the portion of the metal on top of the free propagation region. Due to the angle at which the light signals are incident upon this portion of the buffer layer, this portion of the buffer layer act as a waveguide cladding and can accordingly reduce interaction of the light signals with the metal on top of the free propagation region. As a result, this portion of the buffer layer reduces absorption of the light from the free propagation region and can accordingly reduce polarization dependent optical loss associated with the optical device.

Figure 1A:
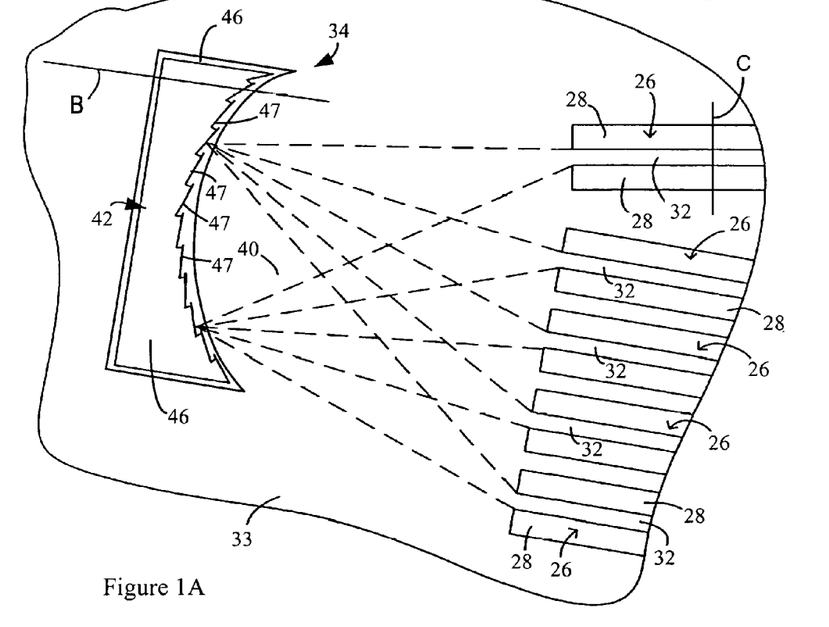
FIG. 1A is a topview of the device.
Figures 1B, 1C:
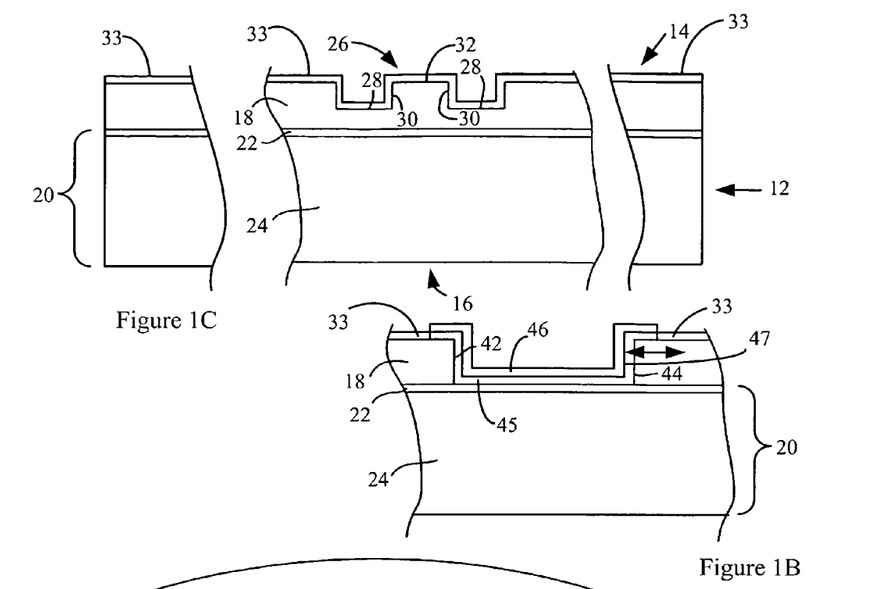
FIG. 1B is a cross-section of the device shown in FIG. 1A taken along the line labeled B.
FIG. 1C is a cross-section of the device shown in FIG. 1B taken along the line labeled C.
Figure 1D:
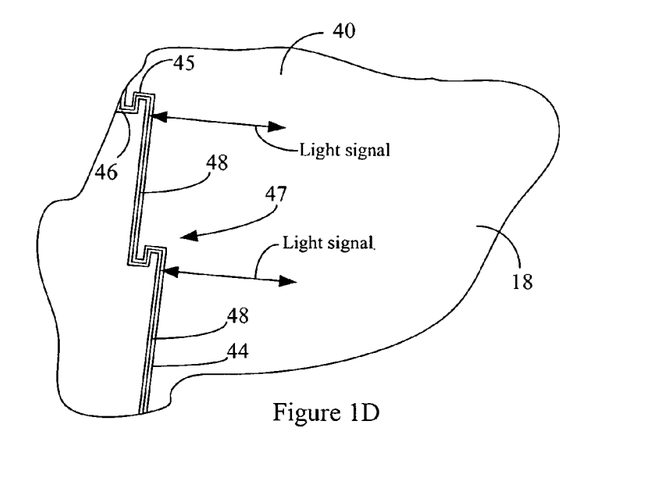
FIG. 1D illustrates the structure of reflecting surfaces included in the optical grating.

FIG. 1A through FIG. 1D illustrate an optical device. FIG. 1A is a topview of the device. FIG. 1B is a cross-section of the device shown in FIG. 1A taken along the line labeled B. FIG. 1C is a cross-section of the device shown in FIG. 1B taken along the line labeled C. FIG. 1D illustrates the structure of the reflecting surfaces included in an optical grating on the optical device. The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 12 (or edges) extending from a top side 14 to a bottom side 16. The propagation direction of light signals along the length of the waveguides on a planar optical device generally extends through the lateral sides 12 of the device. The top side 14 and the bottom side 16 of the device are non-lateral sides.

The device includes a light-transmitting medium 18 positioned on a base 20. The portion of the base 20 adjacent to the light-transmitting medium 18 is configured to reflect light signals from the light-transmitting medium 18 back into the light-transmitting media in order to constrain light signals in the light-transmitting medium 18. For instance, the portion of the base 20 adjacent to the light-transmitting medium 18 can be an optical insulator 22 with a lower index of refraction than the light-transmitting medium 18. The drop in the index of refraction can cause reflection of a light signal from the light-transmitting medium 18 back into the light-transmitting medium 18. Suitable light-transmitting media include, but are not limited to, silicon, polymers, silica, SiN, GaAs, InP and $LiNbO_3$.

The base 20 can include an optical insulator 22 positioned on a substrate 24. As will become evident below, the substrate 24 can be configured to transmit light signals. For instance, the substrate 24 can be constructed of a second light-transmitting medium that is different from the light-transmitting medium 18 or the same as the light-transmitting medium 18. The illustrated device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate 24. The layer of silica can serve as the optical insulator 22 and the silicon substrate 24 can serve as the substrate 24.

The device includes waveguides 26. Trenches 28 that extends part way into the light-transmitting medium 18 each includes one or more waveguide surfaces 30. Each waveguide surface 30 defines a ridge 32 that defines a portion of a waveguide 26. For instance, the ridges 32 and the base 20 define a portion of a light signal-carrying region where light signals are constrained within each of the waveguides 26. When the device is constructed on a silicon-on-insulator wafer, the silica that serves as the insulator 22 has an index of refraction that is less than an index of refraction of the silicon light-transmitting medium 18. The reduced index of refraction prevents the light signals from entering the substrate 24 from the silicon. Different waveguides 26 on the device can have different dimensions or the same dimensions.

A first cladding 33 is positioned on the waveguides. The first cladding 33 can have a lower index of refraction than the light-transmitting medium 18. The drop in the index of refraction can cause reflection of a light signal from the light-transmitting medium 18 back into the light-transmitting medium 18. If foreign materials such as dust or materials from fabrication of the device were able to directly contact the light-transmitting medium 18, these foreign materials could be a source of optical loss in the waveguide. As a result, first cladding 33 can protect the waveguide and can reduce the optical loss associated with these foreign materials. Suitable claddings 33 include, but are not limited to, silicon, polymers, silica, SiN, GaAs, InP and $LiNbO_3$. In some instances, the first cladding 33 material is the same material as the optical insulator 22. For instance, the optical insulator 22 and the first cladding 33 can both be silica.

The device includes an optical grating 34 such as reflective grating. A first portion of the waveguides 26 acts as input waveguide configured to carry a light beam that includes multiple light signals to the optical grating 34. A second portion of the waveguides 26 acts as output waveguides configured to carry light signals away from the optical grating 34. The first portion of the waveguide 26 can include one or more of the waveguides and the second portion of the waveguide 26 can include one or more of the waveguides.

The optical grating 34 is configured to receive a light beam that includes multiplexed light signals from one or more of the input waveguides. The optical grating 34 demultiplexes the light signals such that different light signals are received at different output waveguides. The device can be constructed such that only one of the demultiplexed light signals is received at each output waveguide or such that more than one of the demultiplexed light signals is received at one or more of the output waveguides. A suitable optical grating 34 includes, but is not limited to, reflective gratings. A particular example of a reflective grating is an echelle grating. The illustrated optical grating 34 is an echelle grating.

The grating includes a free propagation region 40 and a grating recess 42. The grating recess 42 is partially defined by surfaces that include an incident surface 44 defined in the light-transmitting medium 18. For instance, the optical device can include a grating recess 42 extending into the light-transmitting medium 18. During operation of the device, a beam from an input waveguide enters the free propagation region 40. The beam includes multiple light signals. The path of the light through the free propagation region 40 is illustrated as dashed lines in FIG. 1A in order to distinguish the light from other features of the device. The light signals travel through the free propagation region 40 and are incident upon the incident surface 44. Since the light signals can be transmitted through the incident surface 44, the incident surface 44 serves as a facet for the free propagation region.

The grating recess optionally includes a buffer layer 45 between the incident surface 44 and a reflecting layer 46. The details of the relationship between the buffer layer 45, incident surface 44, and reflecting layer 46 is not evident from FIG. 1A but can be readily discerned from FIG. 1B and FIG. 1D. The light signals that are incident upon the incident surface 44 are transmitted through the incident surface 44 and then travel through the buffer layer 45 and are reflected by a surface of the reflecting layer 46 as shown by the arrow in FIG. 1B and FIG. 1D. The surface at which an echelle grating reflects lights signals includes a series of stepped reflecting surfaces 47. In some instances, the reflecting surfaces 47 are substantially perpendicular to the base as shown in FIG. 1B. The reflecting surfaces 47 are surfaces of the reflecting layer 46 and are at an interface of the reflecting layer 46 and the buffer layer 45. Suitable materials for the reflecting layer 46 include, but are not limited to, dielectrics, and metals such as Al and Au.

The reflecting surface 47 are configured such that light of different wavelengths separates as it travels away from the reflecting layer 46. Accordingly, the echelle grating demultiplexes the beam into individual light signals, or channels, traveling away from the reflecting layer 46. The channels are received at the output waveguides. FIG. 1A illustrates the output waveguides configured such that each of the channels is received on a different one of the output waveguides.

FIG. 1D illustrates the structure of the reflecting surfaces 47 included in the optical grating. The reflecting surfaces 47 each includes a primary reflecting surface 48. Although the primary reflecting surfaces 48 are illustrated as being substantially flat, the primary reflecting surfaces 48 can be a curve such as an elliptical curve. As is evident from FIG. 1D, the primary reflecting surface 48 are the surfaces that are designed to reflect the light signals such that the light signals separate.

Figure 1E:
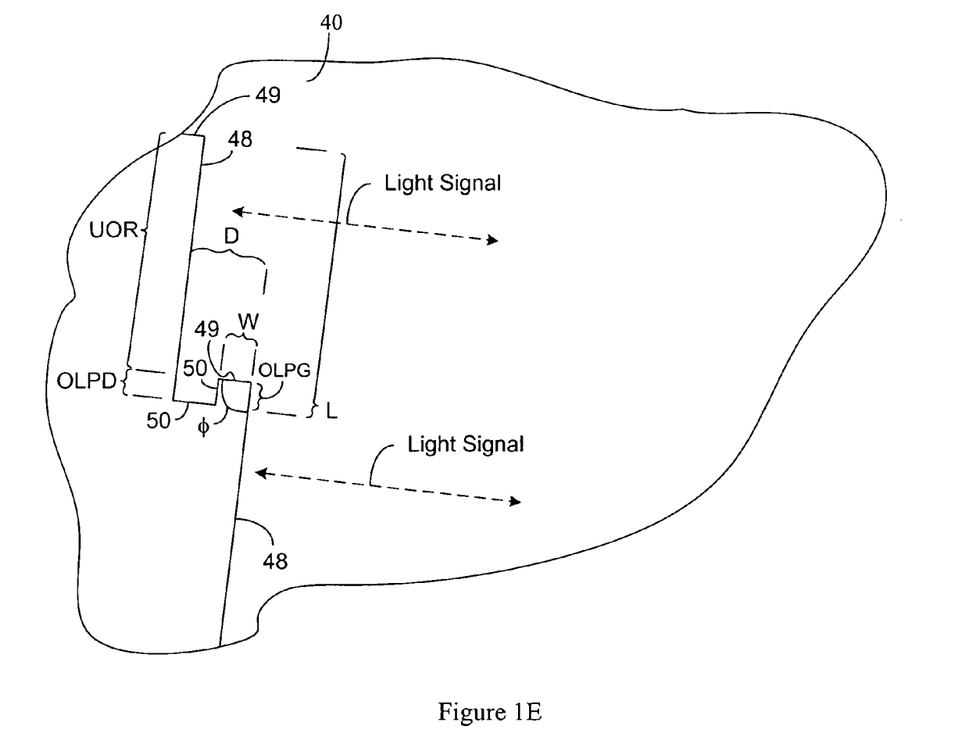
FIG. 1E labels various dimensions of reflecting surfaces constructed according to FIG. 1A through FIG. 1D.

FIG. 1E shows the details of the relationships between the different surfaces on the grating. While the reflecting surfaces are shown in FIG. 1E, the buffer layer 45 and the reflecting layer 46 are not shown in order to simplify the Figure. The illustrated primary reflecting surfaces 48 each has an overlapped region and an overlapping region. The width of the overlapped region of one of the primary reflecting surfaces 48 is labeled OLPD in FIG. 1E. The width of the overlapping region of one of the primary reflecting surfaces 48 is labeled OLPG in FIG. 1E. The overlapping region of a primary reflecting surface 48 is located between the incoming light signal and the overlapped region of another primary reflecting surface 48. As a result, the overlapping region of a primary reflecting surface 48 receives the light signals and prevents the overlapped region of another reflecting surface from receiving the light signal. Accordingly, the overlapped region of a primary reflecting surface 48 does not receive the light signals but the un-overlapped region of the primary reflecting surface 48 receives the light signals. The width of the un-overlapped region of one of the primary reflecting surfaces 48 is labeled UOR in FIG. 1E. As is evident in FIG. 1D and FIG. 1E, the un-overlapped region of a primary reflecting surface 48 can include the overlapping region of the primary reflecting surface 48.

In some instances, the contour of the overlapped region of a primary reflecting surface 48 is continuous with the contour of the remainder of the primary reflecting surface 48. For instance, in some instances, the overlapped region of the primary reflecting surface 48 is substantially flat when the remainder of the primary reflecting surface 48 is substantially flat. As another example, in some instances, the overlapped region of the primary reflecting surface 48 is substantially elliptical when the remainder of the primary reflecting surface 48 is substantially elliptical. Additionally or alternately, in some instances, the contour of the overlapping region of a primary reflecting surface 48 is continuous with the contour of the remainder of the primary reflecting surface 48. For instance, in some instances, the overlapping region of the primary reflecting surface 48 is substantially flat when the remainder of the primary reflecting surface 48 is substantially flat. As another example, in some instances, the overlapped region of the primary reflecting surface 48 is substantially elliptical when the remainder of the primary reflecting surface 48 is substantially elliptical.

At least a portion of the primary reflecting surfaces 48 each includes an overlapped region and at least a portion of the primary reflecting surfaces 48 each includes an overlapping region. For instance, when the arrangement of primary reflecting surfaces 48 illustrated in FIG. 1D or FIG. 1E is expanded to a grating such as the grating of FIG. 1A, all but one of the primary reflecting surfaces 48 each includes an overlapped region and all but one of the primary reflecting surfaces 48 each includes an overlapping region.

A shadow surface 49 is connected directly to each of the primary reflecting surfaces 48 shown in FIG. 1E and FIG. 1D. The light signals will have some interaction with these shadow surfaces 49. The reflecting layer 46 on these shadow surfaces 49 can absorb incident light signals and is accordingly a source of optical loss for the optical device. However, one or more secondary surfaces 50 can connect a primary reflecting surface 48 to a shadow surface 49. The secondary surfaces 50 are located behind a primary reflecting surface 48 so light signals do not interact with the secondary surfaces 50. For instance, the primary reflecting surface 48 is located between the input waveguide and the secondary surfaces 50. FIG. 1D and FIG. 1E show the secondary surfaces 50 located between primary reflecting surfaces 48.

As is evident in FIG. 1D and FIG. 1E, the use of the secondary reflecting surfaces to connect a primary reflecting surface 48 to a shadow surface 49 can reduce the length of the shadow surface 49 (labeled W in FIG. 1E). The reduced length of the shadow surface 49 reduces the interaction of the light signals with the shadow surface 49 and accordingly reduces the level of optical loss associated with the shadow surface 49.

The angle between the shadow surface 49 and the primary reflecting surface 48 is labeled $\phi$ FIG. 1E. As the angle $\phi$ is reduced, the point between the primary reflecting surface 48 and the shadow surface 49 becomes sharper. As will become evident below, the process of fabricating these devices typically includes etching surfaces such as the primary reflecting surfaces 48 and the shadow surfaces 49. The limitations of these etching processes cause sharp points to become rounded. As a result, the intersection between the primary reflecting surface 48 and the shadow surface 49 becomes more rounded as the angle $\phi$ is reduced. Since the light signals are reflected off this intersection. The rounding of this intersection causes the light signals to be reflected in undesired directions and is accordingly a source of optical loss. Accordingly, increasing the angle $\phi$ can be associated with a reduction in the level of optical loss. As a result, in some instances, in order to produce substantially pointed, rather than rounded, intersections between the primary reflecting surface and the associated shadow surfaces, at least a portion of the angles $\phi$ that are each associated with a particular primary reflecting surface 48 can each be selected such that the shadow surfaces 49 are substantially parallel to the direction at which the light signals are incident on the primary reflecting surface 48 at the location where the primary reflecting surface 48 intersects the associated shadow surface 49. The angle $\phi$ associated with different primary reflecting surfaces 48 can be different.

Figure 1F:
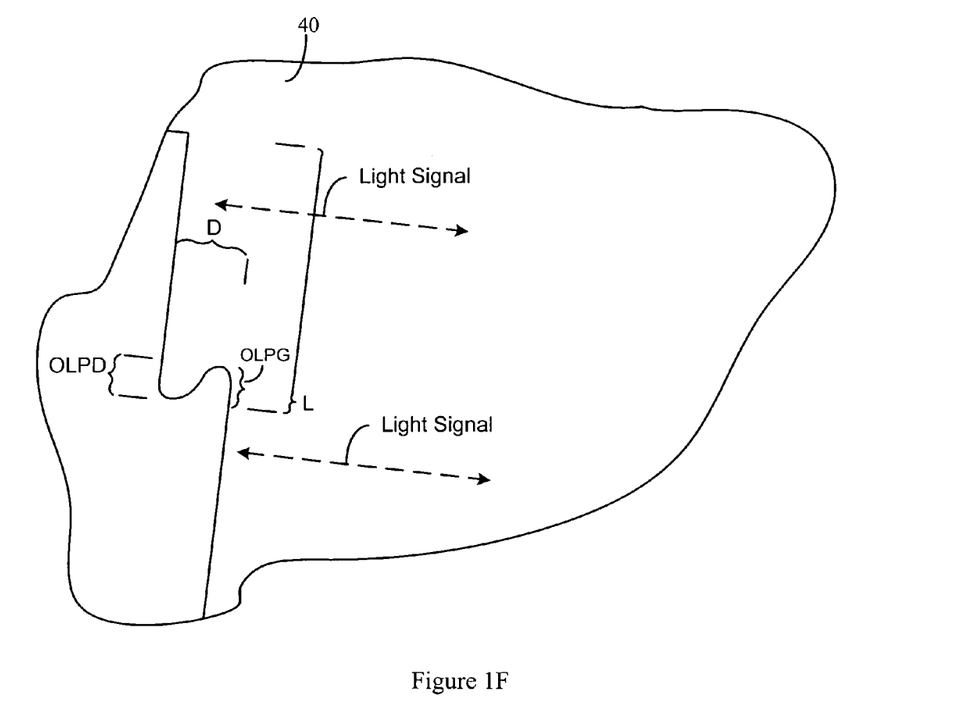
FIG. 1F illustrates another embodiment of reflecting surfaces constructed according to FIG. 1A through FIG. 1D.

The rounding of the surface intersections discussed above can cause a secondary surfaces 50 and a shadow surface 49 and/or a shadow surface 49 and a primary reflecting surface to form a single surface as shown in FIG. 1F. The single surface curves behind the primary reflecting surface 48 similar to the secondary surfaces 50 disclosed above. The single surface then blends into the overlapped region of a second primary reflecting surface 48. The overlapped region of the second primary reflecting surface 48 can be distinguished from the single surface in that the overlapped region of the second primary reflecting surface 48 follows the contour of the remainder of the second primary reflecting surface 48 while the single surface does not.

The width of the overlapped region of one of the primary reflecting surfaces 48 is labeled OLPD in FIG. 1E. In some instances, at least a portion of the overlapped regions in the grating have widths greater than 0.2 µm, 0.5 µm, or 1 µm and/or less than 1.5 µm, 2 µm, or 3 µm. The width of the overlapping region of one of the primary reflecting surfaces 48 is labeled OLPG in FIG. 1E. The width of the overlapping region can be these same or different from the width of the associated overlapped region. In some instances, at least a portion of the overlapping regions in the grating have widths greater than 0.2 µm, or 2 µm and/or less than 3 µm, 4 µm, or 5 µm. The width of the primary reflecting surface 48 is labeled L in FIG. 1E. In some instances, at least a portion of the primary reflecting surface 48 have a width greater than 1 µm, 2 µm, or 3 µm and/or less than 4 µm, 8 µm, or 10 µm. These dimensions can provide a grating having the advantages of the above step shapes.

The width of a shadow surface 49 is labeled W in FIG. 1E. In some instances, at least a portion of the shadow surfaces have a width greater than 0.2, 1, or 2 and/or less than 3, 4, or 5. In some instances, at least a portion of the primary reflecting surfaces have a separation (labeled D in FIG. 1E) greater than 1, 2, or 4 and/or less than 6, 8, or 10. In some instances, at least a portion of the shadow surfaces are construed such that the width of the shadow surface (labeled W in FIG. 1E) is less than 50%, 40%, or 30% of the distance between adjacent primary reflecting surfaces 48 (labeled D in FIG. 1E).

As is evident from FIG. 1A and FIG. 1D, the primary reflecting surface are the surfaces that are designed to reflect the light signals such that the light signals separate. The reflecting layer 46 is located on the primary reflecting surfaces 48 but can also be positioned on the shadow surfaces 49. A portion of the buffer layer 45 is between the incident surface 44 and the portion of the reflecting layer 46 on the shadow surfaces 49. Due to the angle at which the light signals are incident upon this portion of the buffer layer 45, this portion of the buffer layer 45 acts as a waveguide cladding and accordingly reduces interaction of the light signals with the metal on the shadow surfaces 49. As a result, this portion of the buffer layer 45 reduces absorption of the light from the free propagation region and further reduces the optical loss associated with the optical device.

As is evident from FIG. 1B, an upper portion of the reflecting layer 46 is positioned over the light-transmitting medium 18. For instance, a portion of the reflecting layer 46 is positioned such that the light-transmitting medium 18 is between the base 20 and the reflecting layer 46. Further, a portion of the free propagation region is between the base 20 and the reflecting layer 46. However, the buffer layer 45 is positioned between the upper portion of the reflecting layer and the light-transmitting medium 18. As a result, light signals in the free propagation region are not directly exposed to the upper portion of the reflecting layer 46. Accordingly, the light absorption associated with direct exposure of these light signals to the upper portion of the reflecting layer 46 is reduced.

The buffer layer 45 can be a different material from the first cladding 33 or can be the same material as the first cladding 33.

The thickness of the buffer layer 45 between the reflecting layer 46 and the incident surface 44 the can affect reflectivity at the reflecting surface. A suitable thickness for the buffer layer 45 between the reflecting layer 46 and the incident surface 44 includes, but is not limited to, a thickness greater than 5 nm, or 10 nm or 15 nm and/or less than 50 nm, 100 nm, or 1000 nm. The thickness of an upper portion of the buffer layer 45 (the portion of the buffer layer between the top of the light-transmitting medium 18 and the upper portion of the reflecting layer 46) can affect amount of light signal absorption by the upper portion of the reflecting layer 46. For instance, reducing the thickness of the upper portion of the buffer layer 45 can increase light signal absorption. A suitable thickness for the upper portion of the buffer layer 45 includes, but is not limited to, a thickness greater than, 5 nm, or 10 nm or 15 nm and/or less than 50 nm, 100 nm, or 1000 nm.

The buffer layer 45 can have an index of refraction that is less than the index of refraction of the light-transmitting medium 18. As a result, the upper portion of the buffer layer 45 can act as a waveguide cladding or cladding of the free propagation region that reduces optical loss. Accordingly, in some instances, the first cladding 33 serves as the buffer layer 45 and is continuous with the buffer layer. For instance, the buffer layer 33 can extend from over the free propagation region and into the grating recess 42 such that the buffer layer 33 is positioned between the reflecting layer 46 and the incident surface 44. The use of the first cladding 33 as the buffer layer reduces the number of steps needed to fabricate the optical device by allowing both the buffer layer 45 and the first cladding 33 to be formed in a single step. In one example, the buffer layer 45, the insulator 22, and the first cladding 33 are each made of the same material. For instance, the buffer layer 45, the insulator 22, and the first cladding 33 can each be silica.

Figure 1G:
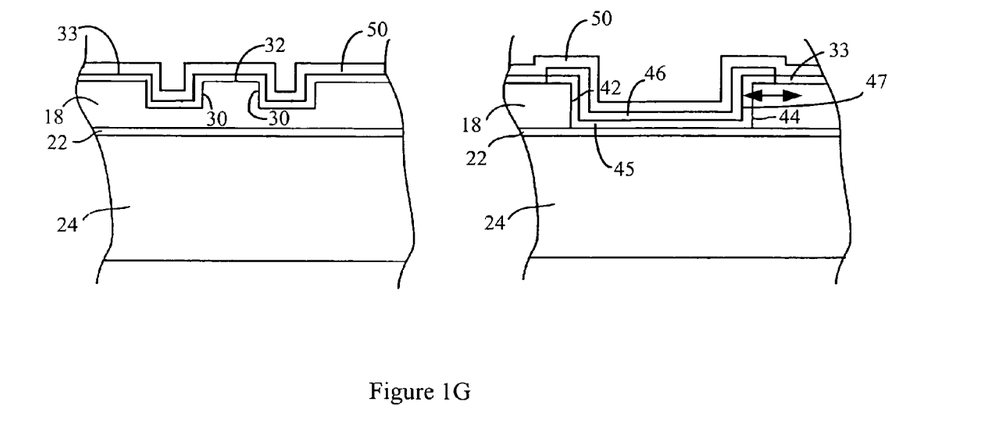
FIG. 1G illustrates one or more secondary cladding layers formed on the optical device of FIG. 1A through FIG. 1E.

One or more secondary cladding layers can be optionally be formed over the portion of the optical device illustrated in FIG. 1A through FIG. 1F. For instance, FIG. 1G illustrates a secondary lading layer formed over the optical device of FIG. 1A through FIG. 1E. In particular, FIG. 1G illustrates the secondary lading layer formed over the portions of the optical device illustrated in FIG. 1B and FIG. 1C. Examples of secondary cladding layers include silica and silicon nitride. In one example, the one or more secondary cladding layers include a layer of silica and a layer of silicon nitride. The layer of silica can be between the optical device and the layer of silica nitride. In one instance, the layer of silica and the layer of silicon nitride are each about 1 micron thick.

As noted above, the buffer layer 45 is optional. In instances where the buffer layer 45 is excluded, the light signals that are incident upon the incident surface 44 are transmitted through the incident surface 44 and are reflected by a surface of the reflecting layer 46. The reflecting layer 46 is also optional. In instances where the reflecting layer 46 and buffer layer 45 are excluded, the light signals that are incident upon the incident surface 44 can be reflected by the incident surface as a result of a drop in the index of refraction at an interface between the incident surface 44 and a medium in the grating recess. Alternately, in instances where the reflecting layer 46 is excluded, the light signals that are incident upon the incident surface 44 are transmitted through the incident surface 44 and then travel through the buffer layer 45 and are reflected by a drop in the index of refraction at the interface of the buffer layer 45 and a medium in the grating recess. Examples of suitable media in the grating recess include the atmosphere in which the device is located such as ambient air.

FIG. 2A to 4C illustrate a method of forming an optical device according to FIG. 1A through 1C but with the first cladding 33 serving as the buffer layer 45 and being continuous with the buffer layer 45. The method is illustrated on a portion of a silicon-on-insulator chip; however, the method can also be executed using other platforms, chips, and/or wafers. Accordingly, the chip and/or wafer can serve as a device precursor. The method employs the self-alignment between the waveguides 26 and the optical grating 34 described in U.S. patent application Ser. No. 12/321,368, filed on Jan. 16, 2009, entitled "Optical Component Having Features Extending Different Depths into a Light Transmitting Medium," and incorporated herein in its entirety.

Figure 2A:
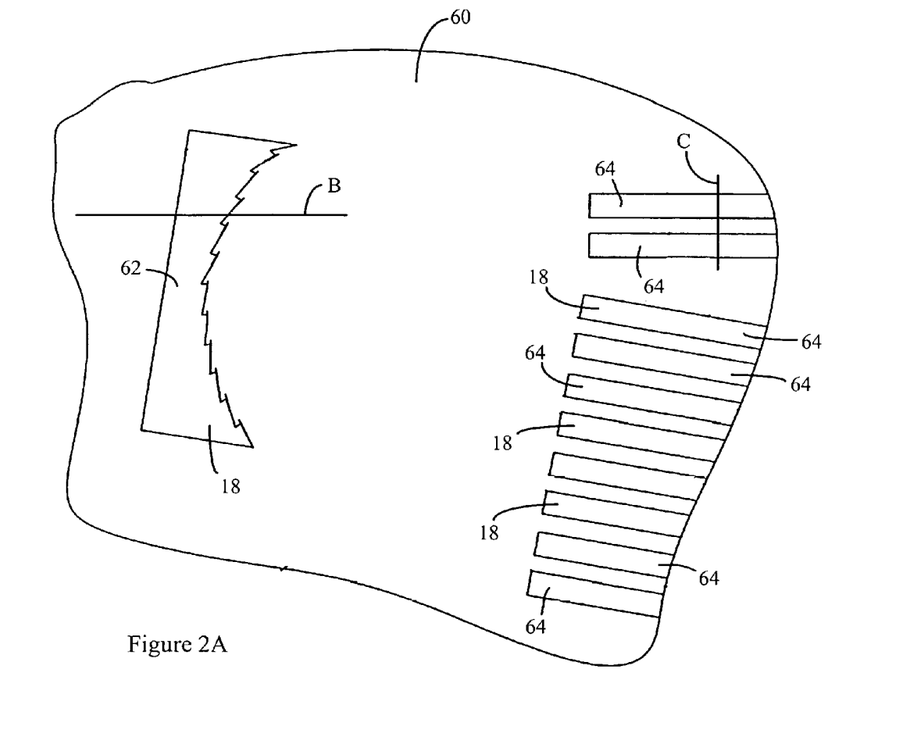
FIG. 2A is a topview of the device precursor.
Figure 2B:
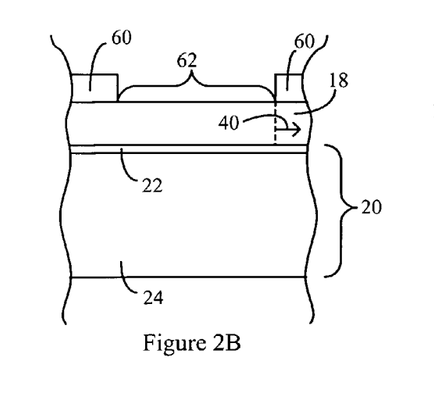
FIG. 2B is a cross section of the device precursor shown in FIG. 2A taken along the line labeled B in FIG. 2A.
Figure 2C:
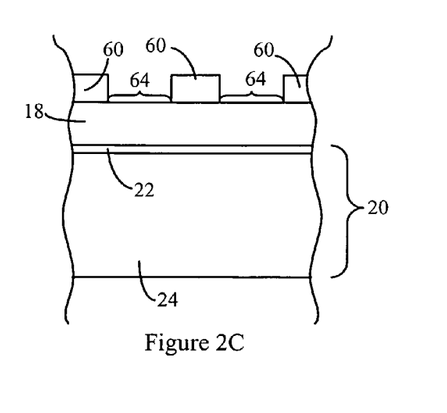
FIG. 2C is a cross section of the device precursor shown in FIG. 2A taken along the line labeled C in FIG. 2C.
Figure 2D:
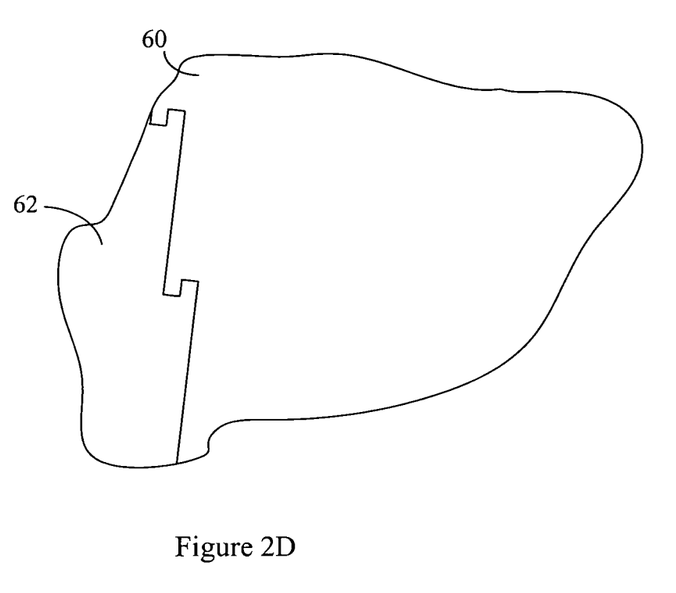

FIG. 2A through FIG. 2C illustrate a portion of a device precursor upon which the waveguides 26 and optical grating 34 is formed. FIG. 2A is a topview of the device precursor. FIG. 2B is a cross section of the device precursor shown in FIG. 2A taken along the line labeled B in FIG. 2A. FIG. 2C is a cross section of the device precursor shown in FIG. 2A taken along the line labeled C in FIG. 2C.

A first mask 60 is formed on the device precursor. The first mask 60 leaves exposed a grating recess region of the device precursor and trench regions 64 of the device precursor. The grating recess region 62 is the region of the device precursor where the grating recess 42 is to be formed. The trench regions 64 are regions of the light-transmitting medium 18 where the trenches 28 are to be formed. The first mask 60 also protects a free propagation region 40 of the device precursor. The free propagation region 40 spans a gap between the trench regions 64 and the grating recess region 62. As will become evident below, the waveguide surfaces 30 and the incident surface 44 are etched sequentially. However, the first mask 60 will define the position of the waveguide surfaces 30 and the incident surface 44. Since a single mask defines the positions of the waveguides 26 and the optical grating 34, the alignment of the waveguides 26 and gratings that is present on the first mask 60 is transferred to the final device.

A suitable first mask 60 includes, but is not limited to, a hard mask such as a silica mask. A silica mask can be formed on the device precursor by thermally growing the silica on the top side of the device precursor followed by forming a photoresist on the silica. The photoresist can be formed with the pattern that is desired for the silica. The device precursor can then be etched and the photoresist removed to provide the patterned silica that serves as the first mask 60. Suitable etches include, but are not limited to, dry or wet etches and either isotropic or anisotropic etches.

Figure 3A:
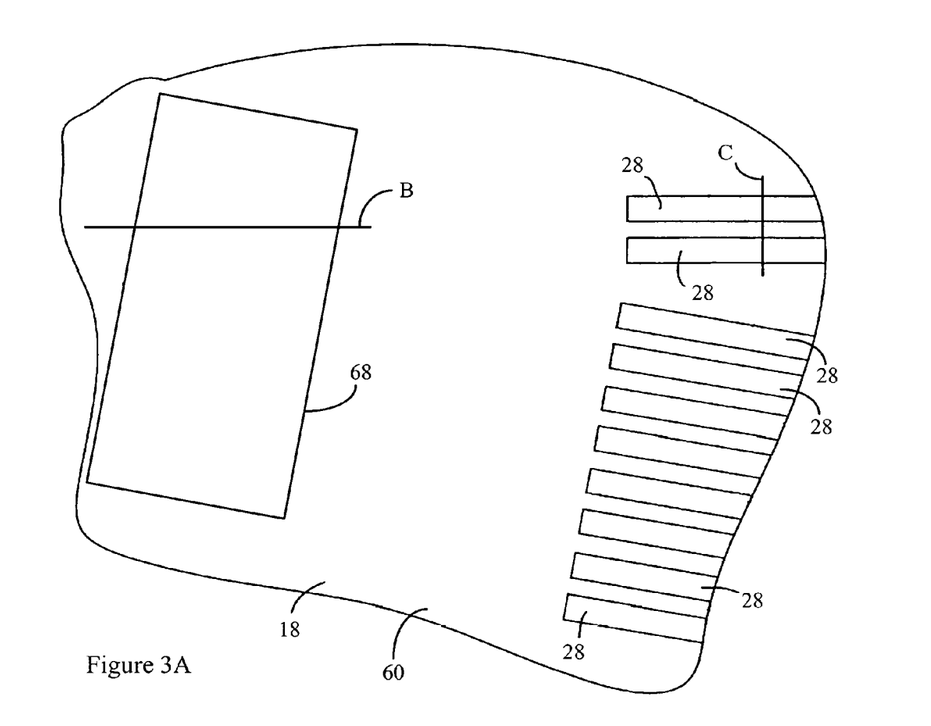
FIG. 3A is a topview of the device precursor.
Figure 3B:
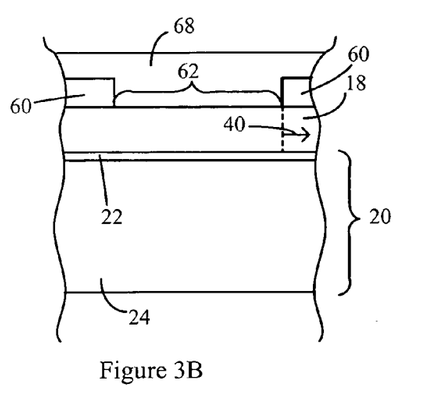
FIG. 3B is a cross section of the device precursor shown in FIG. 3A taken along the line labeled B in FIG. 3A.
Figure 3C:
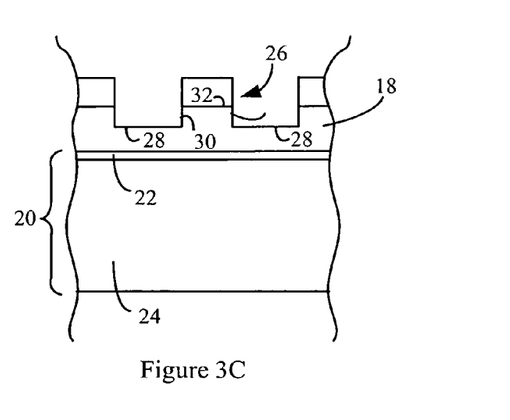
FIG. 3C is a cross section of the device precursor shown in FIG. 3A taken along the line labeled C in FIG. 3C.

A second mask 68 is formed on the device precursor of FIG. 2A through FIG. 2C as shown in FIG. 3A through FIG. 3C. FIG. 3A is a topview of the device precursor. FIG. 3B is a cross section of the device precursor shown in FIG. 3A taken along the line labeled B in FIG. 3A. FIG. 3C is a cross section of the device precursor shown in FIG. 3A taken along the line labeled C in FIG. 3C.

As is evident from FIG. 3A through FIG. 3C, the second mask 68 protects the grating recess region 62 of the device precursor while leaving the trench regions 64 exposed. The first mask 60 is left intact on the device precursor during the formation of the second mask 68. As a result, the regions of the device precursor that were originally protected by the first mask 60 remain protected by the first mask 60. Further, the second mask 68 is formed such that the first mask 60 continues to define the locations of the trench regions 64. As is evident form FIG. 3B, at least a portion of second mask 68 is positioned over the first mask 60.

After formation of the second mask 68, the waveguide surfaces 30 are formed by etching the device precursor to the depth that is desired for the trenches 28. For instance, the device precursor can be etched so as to provide the device precursor illustrate in FIG. 3A through FIG. 3C. As is most evident from FIG. 3C, the etch forms the trenches 28 and accordingly defines the locations of the waveguides 26 on the device precursor. Since the first mask 60 defines the locations of these trenches 28, the first mask 60 defines the locations of the waveguides 26. Suitable etches include, but are not limited to, dry or wet etches and either isotropic or anisotropic etches.

Figure 4A:
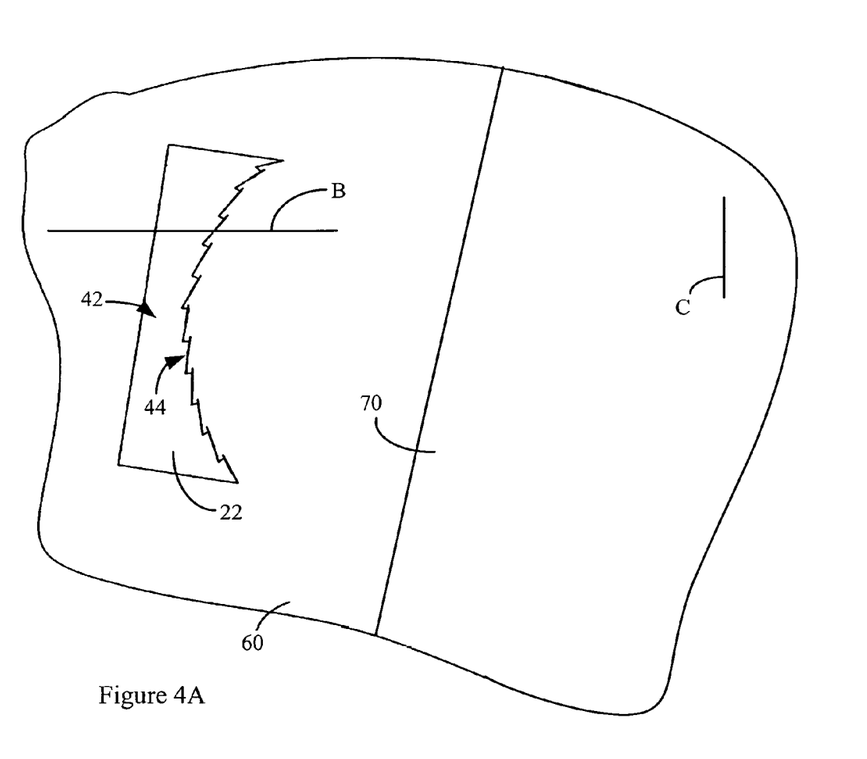
FIG. 4A is a topview of the device precursor.
Figure 4B:
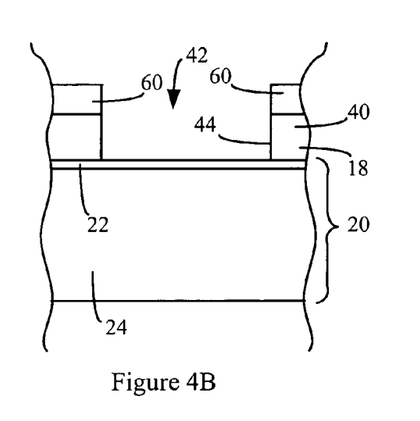
FIG. 4B is a cross section of the device precursor shown in FIG. 4A taken along the line labeled B in FIG. 4A.
Figure 4C:
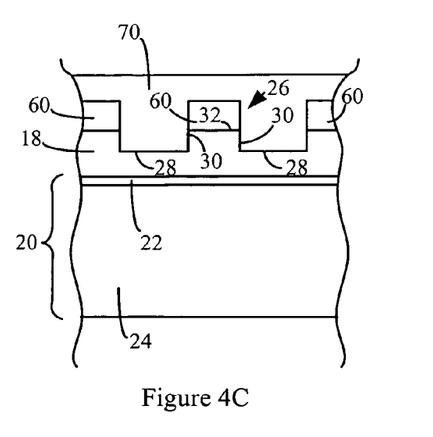
FIG. 4C is a cross section of the device precursor shown in FIG. 4A taken along the line labeled C in FIG. 4C.

The second mask 68 is removed. After removal of the second mask 68, a third mask 70 is formed on the device precursor as shown in FIG. 4A through FIG. 4C. FIG. 4A is a topview of the device precursor. FIG. 4B is a cross section of the device precursor shown in FIG. 4A taken along the line labeled B in FIG. 4A. FIG. 4C is a cross section of the device precursor shown in FIG. 4A taken along the line labeled C in FIG. 4C.

As is evident from FIG. 4A through FIG. 4C, the third mask 70 protects the waveguides 26 while leaving the grating recess region 62 exposed. The first mask 60 is left intact on the device precursor during the formation of the third mask 70. As a result, the regions of the device precursor that were originally protected by the first mask 60 remain protected by the first mask 60. Further, the third mask 70 is configured such that the first mask 60 continues to define the location of the grating recess 42. As is evident form FIG. 4B, at least a portion of third mask 70 is positioned over the first mask 60.

After formation of the third mask 70, the device precursor is etched to the desired depth of the grating recess 42. For instance, the device precursor can etched so as to provide the device precursor illustrate in FIG. 4A through FIG. 4C. As is most evident from FIG. 4C, the etch forms the grating recess 42 and accordingly defines the locations of the grating on the device precursor. Since the first mask 60 defines the location of the grating recess 42 during the etch, the first mask 60 defines the locations of both the grating recess 42 and the waveguides 26 on the optical device. Suitable etches include, but are not limited to, dry or wet etches and either isotropic or anisotropic etches.

Suitable masks for the second mask 68 and/or the third mask 70 include, but are not limited to, photoresists. Other masks can be employed for the second and/or third mask 70. In some instances, the third mask is a hard mask. For instance, the third mask 70 can be generated from multiple layers as disclosed in U.S. patent application Ser. No. 12/321,368, filed on Jan. 16, 2009, entitled "Optical Component Having Features Extending Different Depths into a Light Transmitting Medium," and incorporated herein in its entirety. Examples of other masks that may be employed for the second mask 68 and/or the third mask 70 include or consist of metals and/or polyimides. Examples of suitable metals include aluminum. The type of mask selected can be influenced by the processing parameters that depending on the type of etch being used or to enable a viable process flow for the integration of additional components onto the same substrate as discussed above. Examples of parameters that can influence mask selection include etch angle, level of smoothness desired for etched materials, etch selectivity and feature resolution.

Although FIG. 2A through FIG. 4C illustrate the waveguides 26 formed before the grating recess 42, the waveguides 26 and grating recess 42 can be formed in reverse order. For instance, the second mask 68 and the third mask 70 can be formed in reverse of the order disclosed above. As an example, the third mask 70 disclosed above can be formed before the second mask 68. Further, the third mask 70 can be formed and removed before the second mask 68 is formed.

Figure 5A:
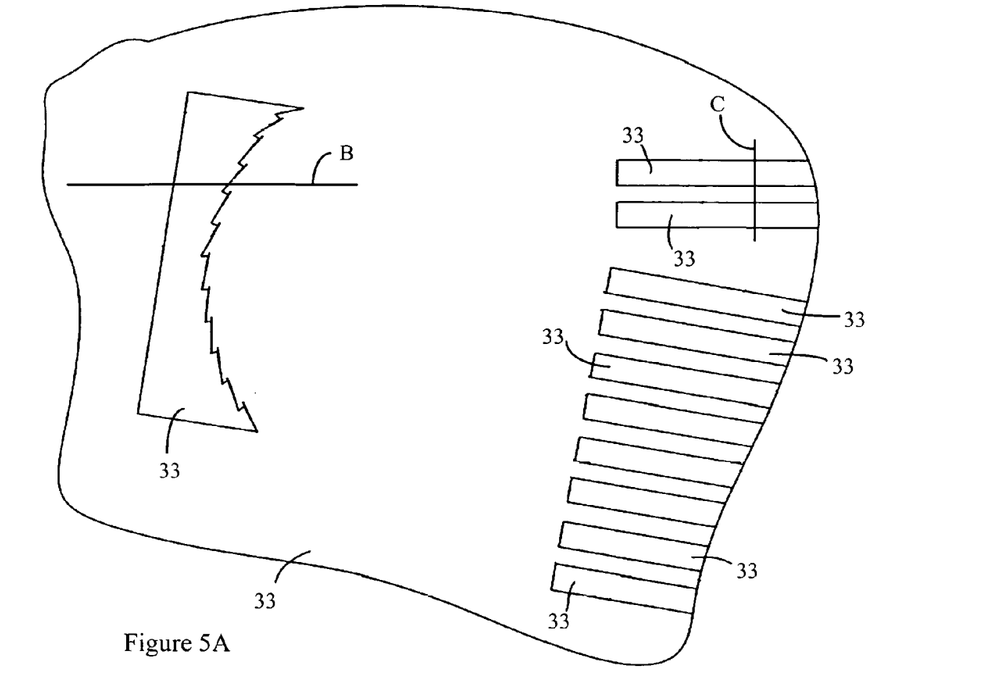
FIG. 5A is a topview of the device precursor.
Figure 5B:
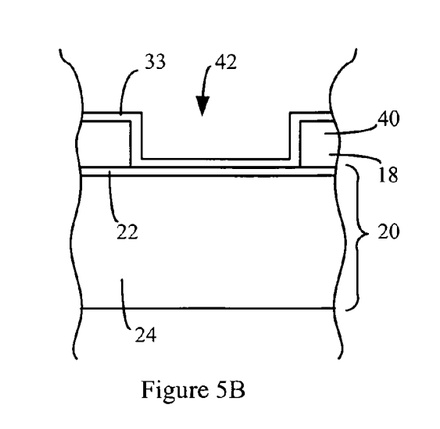
FIG. 5B is a cross section of the device precursor shown in FIG. 5A taken along the line labeled B in FIG. 5A.
Figure 5C:
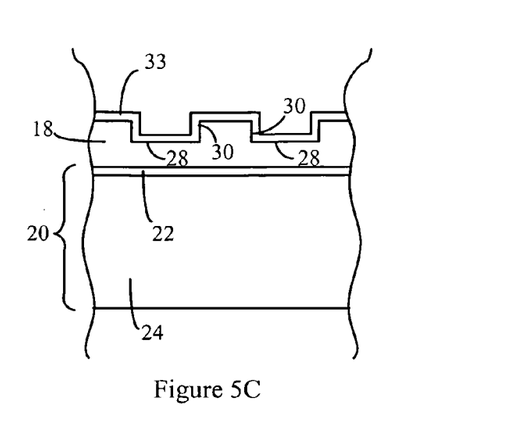
FIG. 5C is a cross section of the device precursor shown in FIG. 5A taken along the line labeled C in FIG. 5C.

The third mask 70 and the first mask 60 can be removed from the device precursor of FIG. 4A through FIG. 4C and the first cladding 33 can be formed on the light-transmitting medium 18 to provide the device precursor of FIG. 5A through FIG. 5C. FIG. 5A is a topview of the device precursor. FIG. 5B is a cross section of the device precursor shown in FIG. 5A taken along the line labeled B in FIG. 5A. FIG. 5C is a cross section of the device precursor shown in FIG. 5A taken along the line labeled C in FIG. 5C.

Suitable methods for forming the first cladding 33 on the light-transmitting medium 18 include, but are not limited to, depositing the first cladding 33 on the light-transmitting medium 18, growing the first cladding 33 on the light-transmitting medium 18. When the light-transmitting medium 18 is silicon and the first cladding 33 is silica, the silica can be thermally grown on the silicon by heating the device precursor in the presence of oxygen so as to convert a portion of the silicon to silica. Thermal growth of the first cladding 33 on the light-transmitting medium can be the preferred method of forming the first cladding 33 on the light-transmitting medium 18 since it results in the first cladding 33 following the shape of the incident surface 44 and accordingly, the stepped reflecting surfaces 47. In contrast, deposition methods can result in the first cladding 33 being formed with an uneven thickness on the incident surface 44.

Figure 6A:
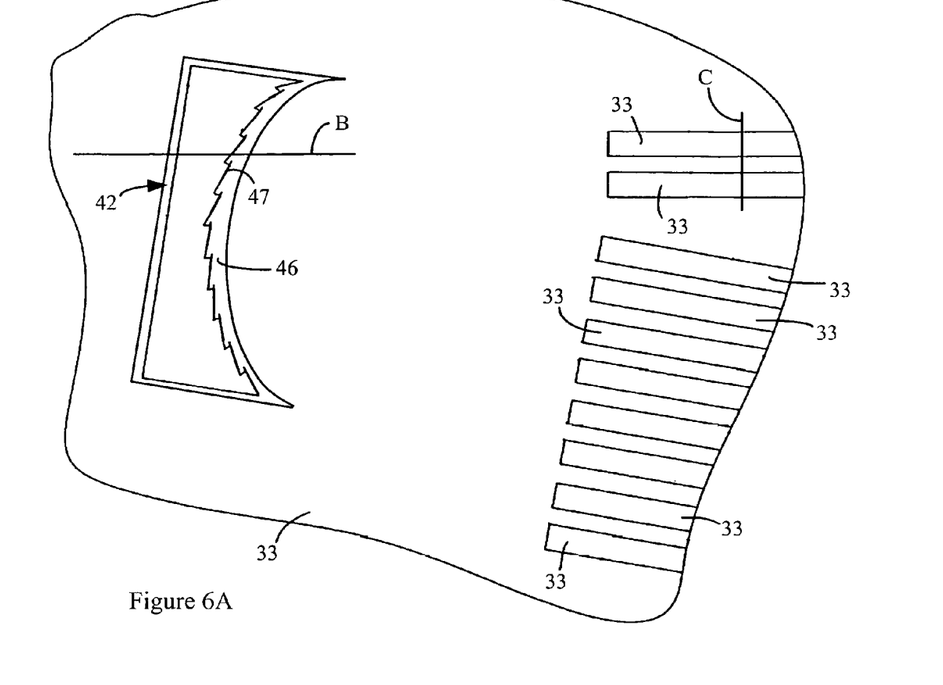
FIG. 6A is a topview of the device precursor.
Figure 6B:
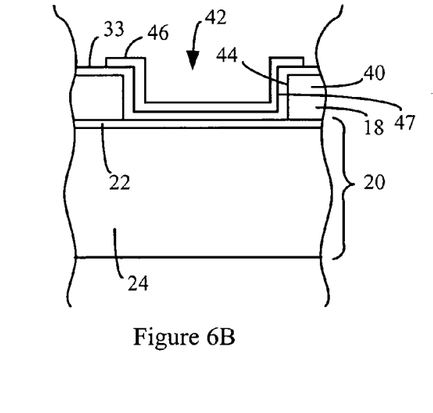
FIG. 6B is a cross section of the device precursor shown in FIG. 6A taken along the line labeled B in FIG. 6A.
Figure 6C:
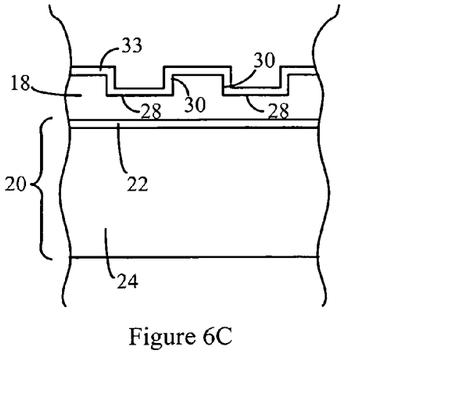
FIG. 6C is a cross section of the device precursor shown in FIG. 6A taken along the line labeled C in FIG. 6C.

The reflecting layer 46 is formed on the device precursor of FIG. 5A through FIG. 5C so as to provide the device precursor of FIG. 6A through FIG. 6C. FIG. 6A is a topview of the device precursor. FIG. 6B is a cross section of the device precursor shown in FIG. 6A taken along the line labeled B in FIG. 6A. FIG. 6C is a cross section of the device precursor shown in FIG. 6A taken along the line labeled C in FIG. 6C. FIG. 6A through FIG. 6C illustrate the optical device of FIG. 1A through FIG. 1C but with the first cladding 33 serving as the buffer layer 45 and being continuous with the buffer layer 45.

The reflecting layer 46 can be formed on first cladding 33 by evaporation, and sputtering. The reflecting layer 46 can then be patterned using traditional integrated circuit manufacturing techniques. For instance, the device precursor can be etched with a patterned fourth mask in place. A suitable fourth mask includes, but is not limited to, a photoresist and oxide. Suitable etches for use with the fourth mask include, but are not limited to, wet etches and dry etches.

One or more secondary cladding layers can optionally be formed over the portion of the optical device illustrated in FIG. 6A through FIG. 6C. Examples of secondary cladding layers include silica and silicon nitride. In one example, the one or more secondary cladding layers include a layer of silica and a layer of silicon nitride. The layer of silica can be between the optical device and the layer of silicon nitride. Suitable methods for depositing the layer of silica on the optical device include, but are not limited to, plasma enhanced chemical deposition (PECVD). Suitable methods for depositing the layer of silicon nitride on the optical device include, but are not limited to, plasma enhanced chemical deposition (PECVD). In one example, the layer of silica and the layer of silicon nitride are sequentially deposited over the upper surface of the entire portion of the optical device illustrated in FIG. 6A through FIG. 6C. The layer of silica and the layer of silicon nitride can each be about 1 micron thick.

Although the optical above device is illustrated as having only waveguides, a free-space region, and an optical grating 34, only a portion of the optical device is illustrated. As a result, the optical device can include a variety of other components. In some instances, one or more of the waveguides 26 carry light signals to and/or from these other components. Examples of these components include, but are not limited to, demultiplexers, multiplexers, filters, switches, amplifiers, attenuators, lasers and other light sources, star couplers, and other waveguides. Additionally or alternately, the device can include electrical components. For instance, the device can include electrical connections for applying a potential or current to a waveguide and/or for controlling other features on the optical device.

Although the optical grating 34 is described as operating like a demultiplexer, the optical grating can be operated in reverse as a multiplexer. For instance, the output waveguides can be operated as input waveguides and the input waveguide can be operated as an output waveguide.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a light-transmitting medium positioned on a base, the light-transmitting medium at least partially defining a free propagation region through which light signals travel; and
a reflective grating including stepped reflecting surfaces positioned such that light signals that travel through the free propagation region are received by the reflecting surfaces, the reflecting surfaces being configured to reflect the light signal back into the free propagation region, the reflecting surfaces reflecting the light signals such that the light signals associated with different wavelengths separate as the light signals travel through the free propagation region,
at least a portion of the reflecting surfaces each including an overlapped region and un-overlapped region,
at least a portion of the reflecting surfaces each including an overlapping region that overlaps one of the overlapped regions such that a plane that is perpendicular to the base and perpendicular to the overlapping region can extend through both the overlapping region and the overlapped region that is overlapped by the overlapping region,
the reflecting grating being configured such that the light signals travel toward the overlapped regions and the un-overlapped regions, the un-overlapped regions being positioned such that the un-overlapped regions receive the light signals but the overlapping regions being positioned between the overlapped region and the light signals such that the overlapping regions receive the light signals before the light signals can be received by the overlapped regions.

2. The device of claim 1, wherein each of the overlapped regions of each reflecting surface has a contour that follows the contour of the un-overlapped region of the reflecting surface and the overlapped regions of each reflecting surface is continuous with the un-overlapped region of the reflecting surface.

3. The device of claim 2, wherein at least a portion of the overlapped regions have a width greater than 0.2 µm.

4. The device of claim 1, wherein the optical grating is an echelle grating.

5. The device of claim 1, wherein a shadow surface and one or more secondary surfaces connect each of the reflecting surfaces to another reflecting surface, each shadow surface being connected directly to one of the reflecting surfaces and the one or more secondary surfaces connecting each of the shadow surfaces to another one of the reflecting surfaces.

6. The device of claim 5, wherein each shadow surface is parallel to a direction that the light signals travel upon being incident on an intersection between the shadow surface and the reflecting surface to which the shadow surface is directly connected.

7. The device of claim 6, wherein the one or more secondary surfaces that connect one of the shadow surfaces to one of the reflecting surface are located behind a second one of the reflecting surfaces such that the second reflecting surface receives the light signals before the light signals can be received by the secondary surface.

8. The device of claim 5, wherein at least a portion of the shadow surfaces have a width less than 5 µm.

9. The device of claim 5, wherein the one or more secondary surfaces are located between reflecting surfaces such that the plane extending through the overlapping region of one of the reflecting surfaces and also through the overlapped region that is overlapped by the overlapping region also extends through the one or more secondary surfaces.

10. The device of claim 1, wherein a portion of the light-transmitting medium that defines the free propagation region having a facet through which the light signals are transmitted,
the grating including a reflecting layer configured to reflect the light signals received by the grating, and
the grating including a buffer layer between the facet and the reflecting layer.

11. The device of claim 10, wherein the buffer layer contacts the facet of the light-transmitting medium and the reflecting layer.

12. The device of claim 11, wherein a cladding on the free propagation region serves as the buffer layer.

13. The device of claim 10, wherein the light-transmitting medium at least partially defines waveguides through which light signals travel,
the waveguide include an input waveguide and output waveguides,
the optical grating is configured to reflect the light signal back into the free propagation region such that the light signals are received at the output waveguides and the optical grating reflects the light signals such that light signals associated with different wavelengths are received at different output waveguides, and
a cladding for the waveguides serves as the buffer layer, the cladding contacting the light transmitting medium.

14. The device of claim 13, wherein the cladding and the buffer layer are silica and the light-transmitting medium is silicon.

15. The device of claim 13, wherein an upper portion of the reflecting layer is positioned on a top of the light transmitting medium and the facet extends from the top of the light transmitting medium toward the base.

16. The device of claim 15, wherein the buffer layer is between the upper portion of the reflecting layer and the free propagation region of the light-transmitting medium.

17. The device of claim 16, wherein the buffer layer is accordance with a layer that is thermally grown on the light-transmitting medium.

18. The device of claim 16, wherein the reflecting layer includes a series of stepped reflecting surfaces, each reflecting surface including a primary reflecting surface and a shadow surface,
the primary reflecting surfaces reflecting the light signals and being arranged such that the light signals associated with different wavelengths separate as the light signals travel through the free propagation region,
the shadow surfaces physically connecting the primary reflecting surfaces, and
the buffer layer and the reflecting layer being positioned on both the primary reflecting surfaces and the shadow surfaces.

* * * * *